US009380049B2

(12) United States Patent
Tang (10) Patent No.: US 9,380,049 B2
(45) Date of Patent: Jun. 28, 2016

(54) METHOD AND SYSTEM FOR AUTHENTICATION-BASED MULTI-USER ONLINE VIDEO GAME

(75) Inventor: Shanjing Tang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 307 days.

(21) Appl. No.: 14/004,200

(22) PCT Filed: Oct. 14, 2011

(86) PCT No.: PCT/IB2011/002835
§ 371 (c)(1),
(2), (4) Date: Sep. 10, 2013

(87) PCT Pub. No.: WO2012/069920
PCT Pub. Date: May 31, 2012

(65) Prior Publication Data
US 2014/0047533 A1 Feb. 13, 2014

(30) Foreign Application Priority Data

Nov. 24, 2010 (CN) .......................... 2010 1 0574810

(51) Int. Cl.
*H04L 29/06* (2006.01)
*G06F 21/33* (2013.01)
*G06F 21/45* (2013.01)
*A63F 13/795* (2014.01)
*A63F 13/73* (2014.01)
(Continued)

(52) U.S. Cl.
CPC ............ *H04L 63/0823* (2013.01); *A63F 13/71* (2014.09); *A63F 13/73* (2014.09);
(Continued)

(58) Field of Classification Search
USPC .......................................................... 726/10
See application file for complete search history.

(56) References Cited

U.S. PATENT DOCUMENTS

2002/0090996 A1* 7/2002 Maehiro ................. A63F 13/12
463/42
2004/0098582 A1* 5/2004 Mori ....................... A63F 13/02
713/156
(Continued)

FOREIGN PATENT DOCUMENTS

CN 1556491 12/2004
CN 1713582 12/2005
(Continued)

OTHER PUBLICATIONS

Anonymous; Battle.net Account Tips; May 26, 2010; XP055223293; Retrieved from the Internet: URL:https://web.archive.org/web/20100526193425/http://classic.battle.net/war3/ladder/w3xp-ladder-info-accountips.aspx; [retrieved on Oct. 23, 2015.
(Continued)

*Primary Examiner* — Jeffrey Pwu
*Assistant Examiner* — Samuel Ambaye
(74) *Attorney, Agent, or Firm* — Patti & Malvone Law Group, LLC (57) ABSTRACT

The invention relates to a method, comprising: registering user groups to a video game server, and assigning video game identifiers for the user groups; authenticating a video game identifier and an authorization certificate input by a user; and registering the user to the video game server and the user groups if both the video game identifier and the authorization certificate are successfully authenticated. And a system, comprising: means for registering user groups to a video game server and assigning video game identifiers for the user groups; means for authenticating a video game identifier and an authorization certificate input by a user; and means for registering the user to the video game server and the user groups when both the video game identifier and the authorization certificate are successfully authenticated.

16 Claims, 5 Drawing Sheets

(51) Int. Cl.
  *A63F 13/71* (2014.01)
  *H04L 9/00* (2006.01)
  *G06F 15/173* (2006.01)
(52) U.S. Cl.
  CPC ............ *A63F 13/795* (2014.09); *G06F 21/33* (2013.01); *G06F 21/45* (2013.01); *G06F 15/173* (2013.01); *G06F 2221/2109* (2013.01); *G06F 2221/2117* (2013.01); *H04L 9/00* (2013.01)

(56) References Cited

U.S. PATENT DOCUMENTS

2005/0227767 A1    10/2005  Shimomura et al.
2010/0285872 A1*   11/2010  Dhupelia et al. ............... 463/29

FOREIGN PATENT DOCUMENTS

CN     1719923        1/2006
EP     2237182       10/2010
KR    20100076238     7/2010

OTHER PUBLICATIONS

Anonymous; Warcraft III—F.A.Q. Battle.net F.A.Q.; Sep. 14, 2010; XP055223082; Retrieved from the Internet: URL:https://web.archive.org/web/20100914201844/http://classic.battle.net/war3/faq/bnetfaq.shtm; [retrieved on Oct. 22, 2015].

Anonymous; Warcraft III—F.A.Q. Multiplayer F.A.Q.; Sep. 15, 2010; XP055223215; Retrieved from the Internet: URL:https://web.archive.org/web/20100915155903/http://classic.battle.net/war3/faq/multiplayer.shtml; [retrieved on Oct. 23, 2015].

* cited by examiner

METHOD AND SYSTEM FOR AUTHENTICATION-BASED MULTI-USER ONLINE VIDEO GAME

FIELD OF THE INVENTION

This invention relates to video game field, in particular, relates to methods and systems for authentication-based multi-user online video games.

BACKGROUND

At present, online video game has become a very popular entertainment. In a multi-user game, two or more users simultaneously play the game in a simulated environment, especially interacting with each other when more users are able to use networks (such as Internet). Although this kind of multi-user game becomes more and more popular, the video games provided on the Internet do not support authentications of participants. Thus, the game participants of each video game session are normally selected at random by video game servers, and users cannot freely choose game participants. The problem in the exiting mechanism is:

Unfamiliar users may be potential attackers or interveners affecting normal communications of other users, this resulting in that networks are unstable and users' requirements of real-time data cannot be guaranteed. In the process of chatting with multiple users, important information of users might be exposed to the unfamiliar users.

Against the problem hereinabove, this invention aims to provide a method and system for authentication-based multi-user online video game, and an authentication-based communication method and system.

The meanings of the abbreviations in the text are listed as follows:
- DTMF: dual-tone multi-frequency;
- HSS: Home Subscriber Server;
- IFC: Initial Filter Criteria;
- IMS: IP Multimedia Subsystem;
- MRF: Media Resource Function;
- CSCF: Call Session Control Function;
- S-CSCF: Serving CSCF;
- P-CSCF; Proxy CSCF;
- I-CSCF: Interrogating CSCF;
- VGDB: Video Game Database;
- VGID: Video Game ID;
- VGS: Video Game Server;
- CMID: CoMmunication ID.

SUMMARY

In order to solve the above problem, the invention provides a method, comprising: registering user groups to a video game server, and assigning video game identifiers for said user groups; authenticating a video game identifier and an authorization certificate input by a user; and registering said user to the video game server and said user groups if both the video game identifier and the authorization certificate are authenticated successfully.

According to another aspect of the invention, further provides a system, comprising: means for registering user groups to a video game server and assigning video game identifiers for said user groups; means for authenticating a video game identifier and an authorization certificate input by a user; and means for registering said user to the video game server and said user groups, when both the video game identifier and authorization certificate are authenticated successfully.

According to another aspect of the invention, further provides a communication method, characterized in that, comprising: registering user groups to a communication server, and assigning communication identifiers for said user groups; authenticating a communication identifier and an authorization certificate input by a user; and registering said user to the communication server and said user groups if both the communication identifier and the authorization certificate are authenticated successfully.

According to another aspect of the invention, further provides a system, comprising: means for registering user groups to a communication server and assigning communication identifiers for said user groups; means for authenticating a communication identifier and an authorization certificate input by a user; and means for registering said user to the communication server and to said user groups if both the communication identifier and the authorization certificate are authenticated successfully.

According to another aspect of the invention, a system is further provided, comprising: a Web server, for registering user groups to a video game server and assigning video game identifiers for said user groups; and a video game server, for authenticating a video game identifier and an authorization certificate input by a user, and registering said user to the video game server and said user groups, if both the video game identifier and the authorization certificate are authenticated successfully.

According to another aspect of the invention, a system is further provided, comprising: a Web server, for registering user groups to a communication server and assigning communication identifiers for said user groups; and a communication server for authenticating a communication identifier and an authorization certificate input by a user, and registering said user to the communication server and said user groups if both the communication identifier and the authorization certificate are authenticated successfully.

Preferably, user groups are created based on requirements preset by the user, before the user groups are registered to the video game server.

Preferably, the user can register to one or more user groups.

Preferably, if the authorization certificate is not authenticated successfully, a refusing registration message is sent to the user.

Preferably, if the authorization certificate is authenticated successfully while the video game identifier is not authenticated successfully, said user will not be registered to any user group, but to the video game server.

DETAILED DESCRIPTION

Now, the exemplary embodiments of the invention are described by referring to the accompanying drawings. However, the invention may be implemented in a number of different ways, and is not limited to the embodiments described here, so these embodiments are provided to thoroughly and completely disclose the invention, and sufficiently convey the scope of the invention to a person skilled in the art. Terms used in the exemplary embodiments in the accompanying drawings are not a limitation to the invention. In the drawings, identical units/elements are represented by identical references.

Unless indicated otherwise, the meanings of the terms (including technical terms) used here are within the scope of normal understanding of those skilled in the art. Moreover, it can be understood that terms defined by commonly used dictionaries should not be interpreted to have idealized or too formal meanings, but shall be interpreted as having consistent meanings with the context of their related fields.

Figure 1:
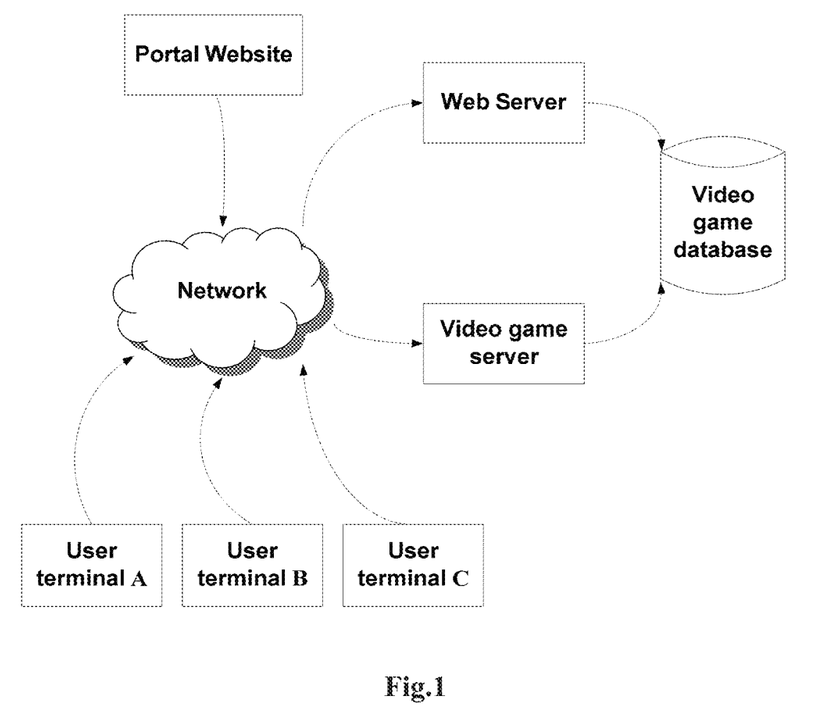
FIG. 1 illustrates a structural diagram of an authentication-based multi-user online video game system according to an embodiment of the invention.

FIG. 1 illustrates a structural diagram of an authentication-based multi-user online video game system according to an embodiment of the invention. Said system includes, but is not limited to: a portal website, a Web server, a video game server, a video game database, a network and a user terminal. The portal website is an interface for registering one or more user groups to a video game server, and a game coordinator registers one or more user groups to a video game server through the portal website. The Web server assigns a video game identifier (VGID) to each user group, said VGID being a unique identifier for differentiating user groups. The VGID could be any universal symbol, such as number, string or combinations thereof. The Web server sends the VGID to a game coordinator and video game database. The Web server requests the user terminal to input an authorization certificate, and the user terminal can be registered to the video game server only when the input authorization certificate is authenticated successfully. The authorization certificate is issued by the video game server, and it could be password or the like.

The video game database is used for storing the VGIDs and related certificates assigned by the Web server. The video game server is used for providing online video game, authenticating game and managing online video game. The network provides a communication connection for the user terminal, portal website, Web server and video game server, which could be a wired or wireless network. The user terminal obtains a VGID from the game coordinator, acquires an authorization certificate from the video game server, and is capable of utilizing the authorization certificate to login the video game server through the network. In addition, the user terminal can use the VGID to join a specific user group.

Figure 2:
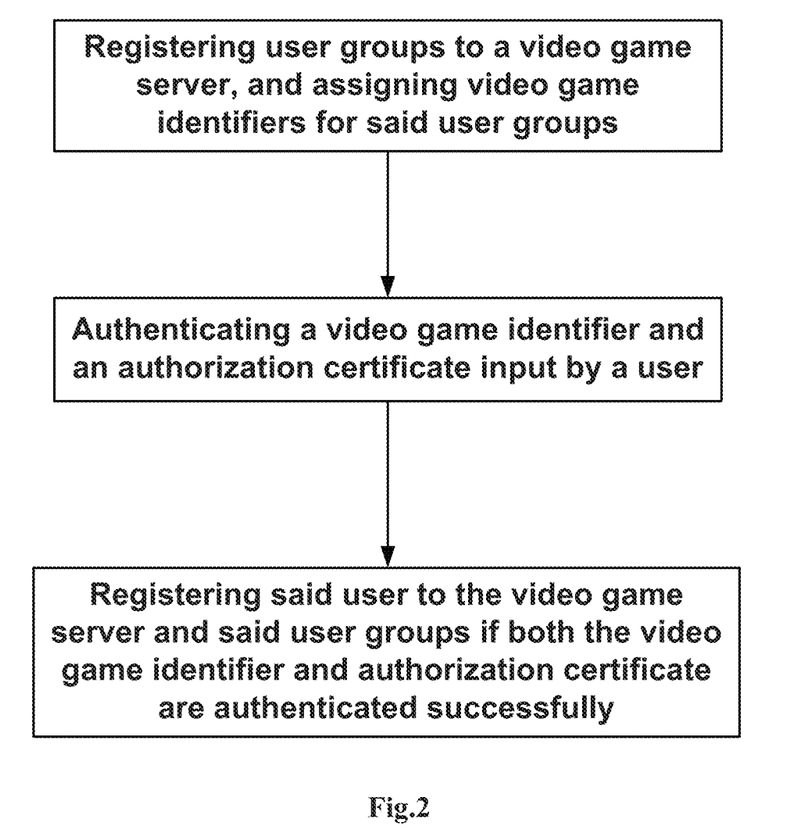
FIG. 2 illustrates a method for an authentication-based multi-user online video game according to an embodiment of the invention.

FIG. 2 illustrates a method for an authentication-based multi-user online video game according to the embodiment of the invention.

Step 1: creating user groups based on requirements preset by the user.

A game coordinator creates user groups in accordance with requirements preset by the user, wherein the requirements preset by the user may include (but are not limited to): user's location, age, name, career, etc, and combinations thereof.

The game coordinator may also create user groups based on the request of the user or of the game server.

Step 2: registering the user groups to a video game server, and assigns video game identifiers for said user groups.

First of all, the game coordinator registers each user group to the video game server through a portal website;

Then, a Web server assigns for each user group a VGID and an authorization certificate used for logging on the video game server, and issues the VGIDs and authorization certificates to the game coordinator which issues the VGIDs and authorization certificates to the user;

At last, the Web server stores the VGIDs and authorization certificates in a video game database.

Step 3: authenticating the VGIDs and authorization certificates input by the user.

Having obtained the VGIDs and authorization certificates from the game coordinator, users of video games are able to use the authorization certificates to log on the video game server through the network, and to use the VGIDs to join the user groups. When a user does not input a VGID or the VGID input by him is not authenticated successfully, he cannot join any user group.

When being transferred to the video game server (VGS), the VGIDs and authorization certificates could be an encrypted value and hash value.

Upon receiving an authorization certificate input by the user, the VGS retrieves the authorization certificates stored in the video game database and compares them with the authorization certificate provided by the user to conduct an authentication on the authorization certificate. If the authorization certificate is authenticated successfully, the user will then be allowed to log on the VGS; otherwise the user will be refused by the VGS.

Upon receiving a VGID input by the user, the VGS retrieves the VGIDs stored in the video game database and compares them with the VGID provided by the user to conduct an authentication on the VGID. If the VGID is authenticated successfully, the user will then be registered to a user group corresponding to the VGID; otherwise the user will not be registered to any user group.

The user may not input a VGID, or may input one or more VGIDs. When the user does not input a VGID, the VGS will not register the user to any user group. When the user inputs one VGID, the VGS authenticates the VGID, and if the VGID is authenticated successfully, the user will be registered to a user group corresponding to the VGID; otherwise the user will not be registered to any user group. If the user inputs a plurality of VGIDs, the VGS authenticates the plurality of VGIDs respectively, and adds the user to user groups corresponding to the VGIDs that are authenticated successfully. Wherein, if all of the plurality of VGIDs can not be authenticated successfully, the user will not be added to any user group.

Figure 3:
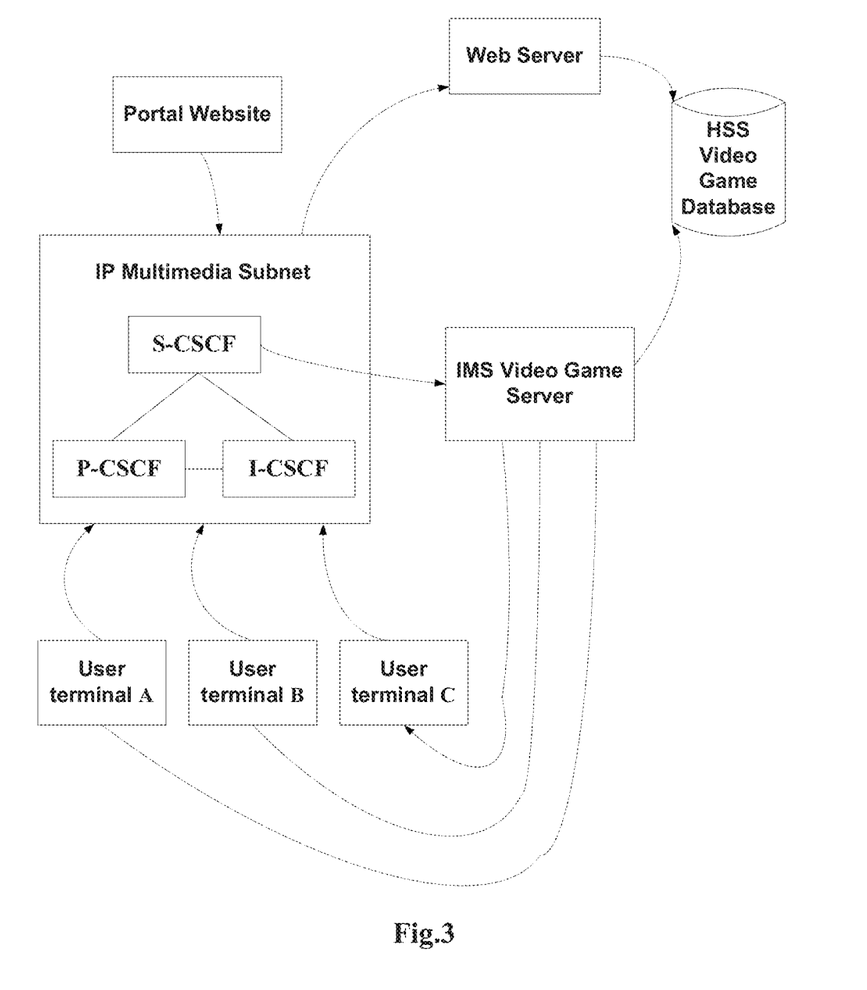
FIG. 3 illustrates a structural diagram of an authentication-based multi-user online video game system in an IP multimedia subsystem according to an embodiment of the invention.

FIG. 3 illustrates a structural diagram of an authentication-based multi-user online video game system in an IP multimedia subsystem according to an embodiment of the invention. Although a preferred embodiment of the invention is explained by taking IMS network as an example, it should be noted that, the invention is not limited to the IMS network, and can be used in other networks.

The system includes but is not limited to: a portal website, a Web server, an IMS video game server, a home subscriber server (HSS) (including a video game database), an IP multimedia subnet and a user terminal. The portal website is an interface registering one or more user groups to a video game server, and a game coordinator registers one or more user groups to a video game server through the portal website. The Web server assigns a video game identifier (VGID) to each user group, said VGID being a unique identifier for differentiating user groups. The VGID could be any universal symbol, such as number, string or combinations thereof. The Web server sends the VGID to the game coordinator and HSS which stores the VGID in the video game database. The Web server requests the user terminal to input an authorization certificate, and the user terminal can be registered to the IMS video game server only if the input authorization certificate is authenticated successfully. The authorization certificate is issued by the IMS video game server, and it could be password or the like.

The HSS, including a video game database, is used for storing the VGIDs and related certificates assigned by the Web server. The IMS video game server is used for providing online video game, authenticating game and managing online video game. The network provides a communication connection for the user terminal, portal website, Web server and video game server, which could be a wired or wireless network. The user terminal obtains a VGID from the game coordinator, acquires an authorization certificate from the IMS video game server, and is capable of utilizing the authorization certificate to login the IMS video game server through the network. In addition, the user terminal can use the VGID to join a specific user group.

The IP multimedia subnet comprises: a serving call session control function (S-CSCF), a proxy call session control function (P-CSCF), and an interrogating call session control function (I-CSCF). The S-CSCF executes the session control function, and maintains session status information depending on the requirements of network operators. In the networks of a same network operator, different S-CSCF may have different functions. But in one calling process, the S-CSCF needs to accomplish the following functions:

Registration; it may serve as a register to make the requested information take effect through a location server after receiving a registration request;

Processing information streams associated and unassociated with the session, comprising: performing a session control for a registered session terminal and serving as a proxy server; after receiving a request, conducting an internal processing or forwarding the request; Or, serving as a user proxy, interrupting or independently initiating a SIP services, providing services for the user by interacting with a service platform, and providing service information related with the terminal.

When representing a calling terminal, acquiring from the database the address of the I-CSCF of the network providing service for the called user according to the called name (such as telephone number or SIP-URL); if the calling and called are in a same network, forwarding the SIP request or response to the S-CSCF in the network; and according to the strategy, forwarding the SIP request or response to the SIP server of the ISP outside the IP multimedia core network subsystem.

When representing a called terminal, forwarding the SIP request or response to the P-CSCF if the user is in a home network; forwarding the SIP request or response to the I-CSCF if the user is in a visited network; and amending the SIP request for incoming calling to be routed to the CS domain according to the interaction of the HSS and service control function When the mobile terminal obtains an IMS server, the P-CSCF is the first contact node. The user device acquires the address of the P-CSCF through a local CSCF discovery process. The P-CSCF serves as a proxy server which processes or forwards the received requests and services, and the P-CSCF may also serve as a user agent to terminate or independently initiates SIP services under abnormal circumstances.

The main function of the P-CSCF comprises: forwarding the SIP registration request message sent from the UE to the I-CSCF which is decided by the domain name provided; forwarding the SIP message sent from the UE to the SIP server, the name of which is obtained by the P-CSCF when the UE initiates a registration; generating a billing record; supporting the encryption process between the UE and P-CSCF; compressing and decompressing the SIP message; and carrying the authentication of resources and QoS management.

The I-CSCF may be served as a connection point of all the network users, and may be used as a service access point of roaming users in the current network service area. There could be a plurality of I-CSCF in a network, the main function of which is: registering, and designating a S-CSCF for the user to perform the SIP registration; processing message streams associated and unassociated with the session, comprising: routing a SIP request received from another network to the S-CSCF; obtaining the address of the S-CSCF from the HSS; forwarding the SIP request or response to the S-CSCF; and generating a billing record.

How to implement a method for an authentication-based multi-user online video game in the system illustrated by FIG. 3 according to an embodiment of the invention is explained in the following description.

Step 1: creating user groups based on requirements preset by the user.

A game coordinator creates user groups in accordance with requirements preset by the user, wherein the requirements preset by the user may include (but are not limited to): user's location, age, name, career, etc, and combinations thereof.

The game coordinator may also create user groups based on the request of the user or of the game server.

Step 2: registering the user groups to a video game server, and assigns video game identifiers for said user groups.

First of all, the game coordinator registers each user group to the IMS video game server through a portal website.

Then, a Web server assigns for each user group a VGID and an authorization certificate used for logging on the video game server, and issues the VGIDs and authorization certificates to the game coordinator which issues the VGIDs and authorization certificates to the user. In the present embodiment, VGID is an important IMS public user identity.

At last, the Web server sends the VGIDs and authorization certificates to a home subscriber server (HSS) which stores the VGIDs and authorization certificates in the video game database in the HSS. The Web server also updates user profiles for the VGIDs newly created in the video game database (VGDB) in the HSS, for example, creating an initial filter criterion of the VGID, such that when the IMS video game server requests to access VGID, the VGID is retrieved that forwarded to the IMS video game server.

Step 3: authenticating the VGIDs and authorization certificates input by the user.

Having obtained the VGIDs and authorization certificates from the game coordinator, such as collecting certificates from the IMS through a DTMF mechanism, users of video games are able to use INVITE messages having authorization certificates to log on the IMS video game server through the network, and to use the VGIDs to join the user groups. When a user does not input a VGID or the VGID input by him is not authenticated successfully, he cannot join any user group. Optionally, the IMS video game server may use a media resource function (MRF) to indicate the users to input their certificates.

When being transferred to the IMS video game server, the VGIDs and authorization certificates could be an encrypted value and hash value.

Upon receiving an authorization certificate input by the user, the IMS video game server retrieves the authorization certificates stored in the video game database of the HSS and compares them with the authorization certificate provided by the user to conduct an authentication on the authorization certificate. If the authorization certificate is authenticated successfully, the user will then be allowed to log on the IMS video game server; otherwise the user will be refused by the IMS video game server.

Upon receiving a VGID input by the user, the IMS video game server retrieves the VGIDs stored in the video game database and compares them with the VGID provided by the user to conduct an authentication on the VGID. If the VGID is authenticated successfully, the user will then be registered to a user group corresponding to the VGID; otherwise the user will not be registered to any user group.

The user may not input a VGID, or may input one or more VGIDs. When the user does not input a VGID, the IMS video game server will not register the user to any user group. When the user inputs one VGID, the IMS video game server authenticates the VGID, and if the VGID is authenticated successfully, the user will be registered to a user group corresponding to the VGID; otherwise the user will not be registered to any user group. If the user inputs a plurality of VGIDs, the IMS video game server authenticates the plurality of VGIDs respectively, and adds the user to user groups corresponding to the VGIDs that are authenticated successfully. Wherein, if all of the plurality of VGIDs can not be authenticated successfully, the user will not be added to any user group.

Figure 4:
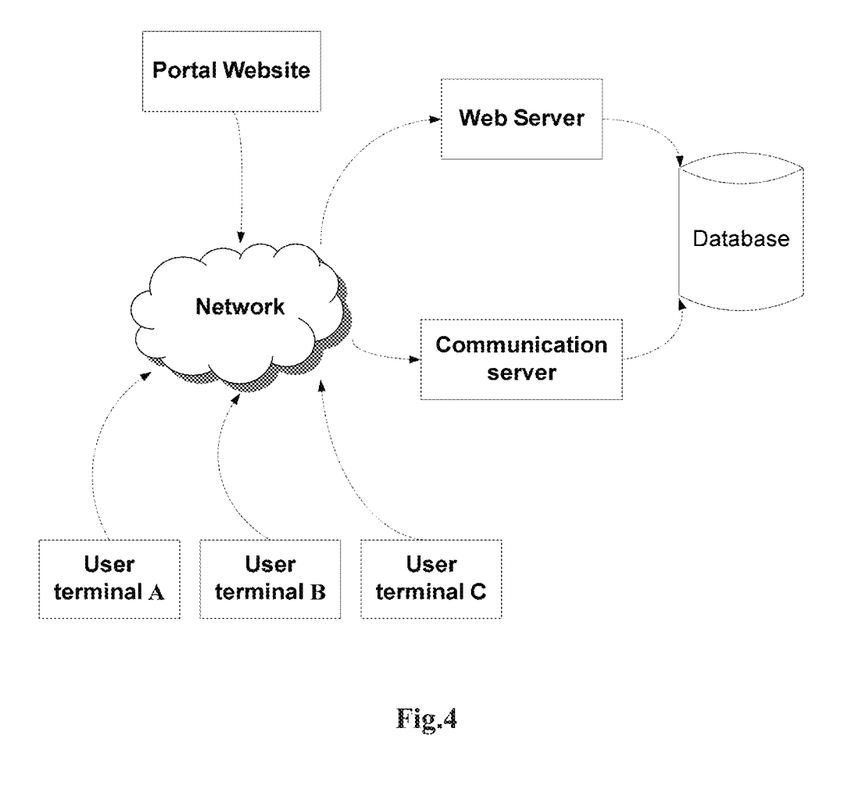
FIG. 4 illustrates a structural diagram of a communication system according to another embodiment of the invention.

FIG. 4 illustrates a structural diagram of a communication system according to another embodiment of the invention. The system includes but is not limited to: a portal website, a Web server, a communication server, a communication database, a network and a user terminal. The portal website is an interface for registering one or more user groups to a communication server, and a game coordinator registers one or more user groups to a communication server through the portal website. The Web server assigns a communication identifier (CMID, CoMmunication ID) to each user group, said CMID being a unique identifier for differentiating user groups. The CMID could be any universal symbol, such as number, string or combinations thereof. The Web server sends the CMID to the game coordinator and communication database. The Web server requests the user terminal to input an authorization certificate, and the user terminal can be registered to the communication server only when the input authorization certificate is authenticated successfully. The authorization certificate is issued by the communication server, and it could be password or the like.

The communication database is used for storing the CMIDs and related certificates assigned by the Web server. The communication server is used for providing online communication, authenticating game and managing online communication. The network provides a communication connection for the user terminal, portal website, Web server and communication server, which could be a wired or wireless network. The user terminal obtains a CMID from the game coordinator, acquires an authorization certificate from the communication server, and is capable of utilizing the authorization certificate to login the communication server through the network. In addition, the user terminal can use the CMID to join a specific user group.

Figure 5:
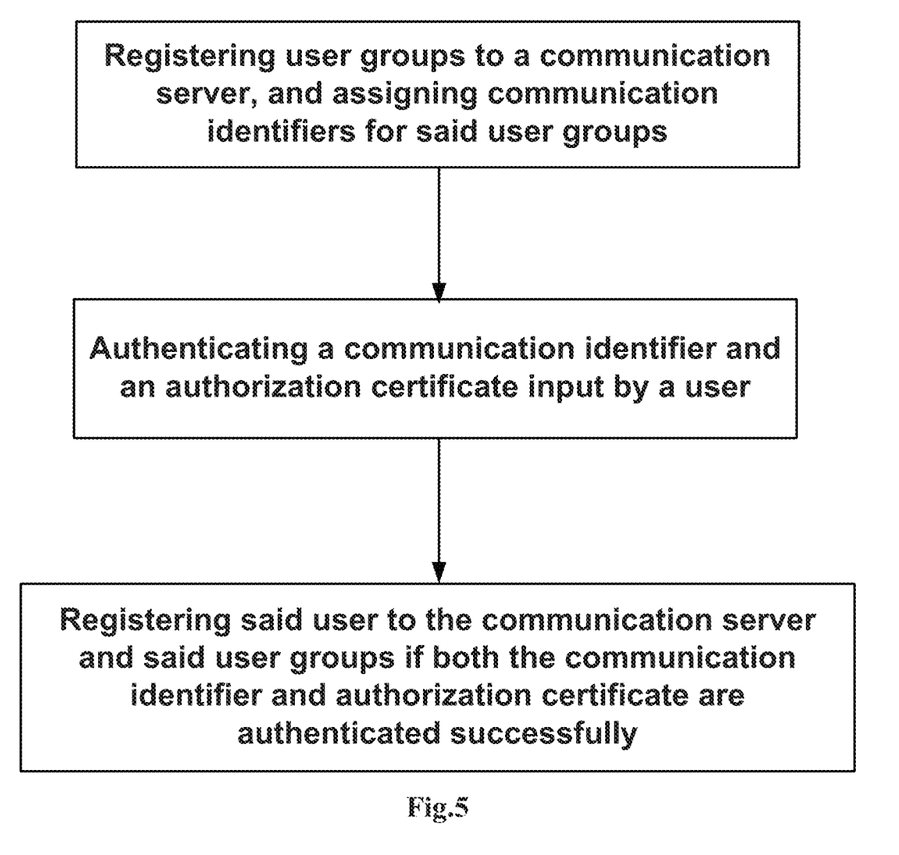
FIG. 5 illustrates a method for an authentication-based communication according to an embodiment of the invention.

How to implement a communication method of an authentication-based in the system illustrated by FIG. 4 according to an embodiment of the invention is described in the following content. FIG. 5 illustrates a method for an authentication-based communication according to an embodiment of the invention.

Step 1: creating user groups based on requirements preset by the user.

A Web server creates user groups in accordance with requirements preset by the user, wherein the requirements preset by the user may include (but are not limited to): user's location, age, name, career, etc, and combinations thereof.

The Web server may also create user groups based on the request of the user or of a communication server.

Step 2: registering the user groups to the communication server, and assigns communication identifiers for said user groups.

First of all, the game coordinator registers each user group to the communication server through a portal website;

Then, a Web server assigns for each user group a communication identifier (CMID) and an authorization certificate used for logging on the communication server, and issues the CMIDs and authorization certificates to the Web server which issues the CMIDs and authorization certificates to the user;

At last, the Web server stores the CMIDs and authorization certificates in a communication database.

Step 3: authenticating the CMIDs and authorization certificates input by the user.

Having obtained the CMIDs and authorization certificates from the game coordinator, the communication users are able to use the authorization certificates to log on the communication server through the network, and to use the CMIDs to join the user groups. When a user does not input a CMID or the CMID input by him is not authenticated successfully, he cannot join any user group.

When being transferred to the communication server, the CMIDs and authorization certificates could be an encrypted value and hash value.

Upon receiving an authorization certificate input by the user, the communication server retrieves the authorization certificates stored in the communication database and compares them with the authorization certificate provided by the user to conduct an authentication on the authorization certificate. If the authorization certificate is authenticated successfully, the user will then be allowed to log on the communication server; otherwise the user will be refused by the communication server.

Upon receiving a CMID input by the user, the communication server retrieves the CMIDs stored in the communication database and compares them with the CMID provided by the user to conduct an authentication on the CMID. If the CMID is authenticated successfully, the user will then be registered to a user group corresponding to the CMID; otherwise the user will not be registered to any user group.

The user may not input a CMID, or may input one or more CMIDs. When the user does not input a CMID, the communication server will not register the user to any user group. When the user inputs one CMID, the communication server authenticates the CMID, and if the CMID is authenticated successfully, the user will be registered to a user group corresponding to the CMID; otherwise the user will not be registered to any user group. If the user inputs a plurality of CMIDs, the communication server authenticates the plurality of CMIDs respectively, and adds the user to user groups corresponding to the CMIDs that are authenticated successfully. Wherein, if all of the plurality of CMIDs can not be authenticated successfully, the user will not be added to any user group.

The invention has already been mainly described by referring to some embodiments. Nevertheless, other embodiments than those disclosed by the invention, which are commonly known by those skilled in the art and defined by the patent claims attached thereto, fall into the scope of this invention equally.

Usually, all the terms used in the claims are interpreted according to their general meanings in the technical art, unless indicated otherwise. All the terms "one/said/the means, component or the like" should be explained as at least one embodiment of the means, component or the like in a broad sense, unless specified otherwise. It is unnecessary to execute the steps of any methods disclosed here in the disclosed and an accurate order, unless specified otherwise.

The invention claimed is:

1. A method, comprising:
   registering a user group by a video game server, wherein said user group is created based on requirements preset by said user before said user group is registered to said video game server;
   authenticating an authorization certificate of a user, and a video game identifier that differentiates said user group from other user groups;
   registering, by said video game server, said user to said user group on the condition that both the video game identifier and the authorization certificate are authenticated successfully; and
   on the condition that the authorization certificate is authenticated successfully and the video game identifier is not authenticated successfully, granting access to said user to the videogame server but not registering said user to said user group.

2. The method according to claim 1, wherein said user can register to one or more user groups.

3. The method according to claim 1, wherein if the authorization certificate is not authenticated successfully, a refusing registration message is sent to said user.

4. A system, comprising:
   a video game server configured to accept registration of a user group, wherein said user group is created based on requirements preset by said user before said user group is registered to said video game server;
   the video game server being further configured to authenticate an authorization certificate of a user, and a video game identifier that differentiates said user group from other user groups;
   the video game server being further configured to register said user to said user group on the condition that both the video game identifier and the authorization certificate are authenticated successfully; and
   the video game server being further configured to accept a logon of said user, but not register said user to said user group, on the condition that the authorization certificate is authenticated successfully and the video game identifier is not authenticated successfully.

5. The system according to claim 4, wherein said user can register to one or more user groups.

6. The system according to claim 4, wherein if the authorization certificate is not authenticated successfully, a registration rejection message is sent to said user.

7. A communication system, comprising:
   a communication server configured to register a user group, wherein said user group is created based on requirements preset by said user before said user group is registered to said video game server;
   the communication server being further configured to authenticate an authorization certificate of a user, and a communication identifier that differentiates said user group from other user groups;
   the communication server being further configured to register said user to said user group on the condition that both the communication identifier and the authorization certificate are authenticated successfully; and
   the communication server being further configured to accept a logon of said user, but not register the user to said user group, on the condition that the authorization certificate is authenticated successfully and the video game identifier is not authenticated successfully.

8. The communication system according to claim 7, wherein said user can register to one or more user groups.

9. The communication system according to claim 7, wherein if the authorization certificate is not authenticated successfully, a refusing registration message is sent to said user.

10. A system, comprising:
    means for registering a user group to a video game server, wherein said user group is created based on requirements preset by said user before said user group is registered to said video game server;
    means for authenticating an authorization certificate input of a user, and a video game identifier that differentiates said user group from other user groups;
    means for registering said user to said user group on the condition that both the video game identifier and the authorization certificate are authenticated successfully; and
    means for logging said user into the video game server, but not registering the user to the user group, on the condition that the authorization certificate is authenticated successfully and the video game identifier is not authenticated successfully.

11. The method according to claim 1, wherein said video game server receives said video game identifier and said authorization certificate via an Internet Protocol multimedia subsystem (IMS) network.

12. The method according to claim 1, wherein said user group is a first user group of a plurality of user groups registered to said video game server, and said user is registered to each of said plurality of user groups on the condition that an authorization certificate and video game identifier are authenticated corresponding to each of said plurality of user groups.

13. The system according to claim 4, wherein said video game server is further configured to receive said video game identifier and said authorization certificate via an Internet Protocol multimedia subsystem (IMS) network.

14. The system according to claim 4, wherein said user group is a first user group of a plurality of user groups registered to said video game server, and said video game server is further configured to registered said user to each of said plurality of user groups on the condition that an authorization certificate and video game identifier are authenticated corresponding to each of said plurality of user groups.

15. The communication system according to claim 7, wherein said communication server is further configured to receive said video game identifier and said authorization certificate via an Internet Protocol multimedia subsystem (IMS) network.

16. The method according to claim 1, wherein said video game identifier is assigned by a web server.

* * * * *